US012596742B2

(12) United States Patent
Prasad

(10) Patent No.: US 12,596,742 B2
(45) Date of Patent: Apr. 7, 2026

(54) METHOD AND SYSTEM FOR CURATING MEDIA CONTENT

(71) Applicant: Meenal Prasad, Pleasanton, CA (US)

(72) Inventor: Meenal Prasad, Pleasanton, CA (US)

( * ) Notice: Subject to any disclaimer, the term of this patent is extended or adjusted under 35 U.S.C. 154(b) by 0 days.

(21) Appl. No.: 18/796,180

(22) Filed: Aug. 6, 2024

(65) Prior Publication Data

US 2025/0053591 A1     Feb. 13, 2025

Related U.S. Application Data

(60) Provisional application No. 63/531,336, filed on Aug. 8, 2023.

(51) Int. Cl.
G06F 16/45       (2019.01)
G06F 16/48       (2019.01)
G06F 16/738      (2019.01)

(52) U.S. Cl.
CPC .............. G06F 16/45 (2019.01); G06F 16/48 (2019.01); G06F 16/739 (2019.01)

(58) Field of Classification Search
CPC ......... G06F 16/45; G06F 16/739; G06F 16/48
See application file for complete search history.

(56) References Cited

U.S. PATENT DOCUMENTS

| | | | | |
|---|---|---|---|---|
| 7,987,484 B2 * | 7/2011 | Sloo | ...................... | H04N 21/84 |
| | | | | 707/804 |
| 10,715,862 B2 * | 7/2020 | Li | ........................... | G06F 18/22 |
| 11,451,863 B1 * | 9/2022 | Benjamin | ............. | H04L 67/535 |
| 11,917,223 B2 * | 2/2024 | Gerede | .............. | H04N 21/4332 |
| 2010/0332485 A1 * | 12/2010 | Lahti | ...................... | G06F 16/44 |
| | | | | 707/758 |
| 2016/0321355 A1 * | 11/2016 | Yin | ...................... | G06F 16/335 |
| 2017/0344900 A1 * | 11/2017 | Alzahrani | ............. | G06F 16/435 |
| 2017/0366861 A1 * | 12/2017 | Chung | ................... | G06Q 50/00 |
| 2018/0067935 A1 * | 3/2018 | Kumar | .................. | G06F 16/435 |
| 2020/0192905 A1 * | 6/2020 | Drochomirecki | ... | G06F 16/9538 |

* cited by examiner

*Primary Examiner* — Jared M Bibbee
(74) *Attorney, Agent, or Firm* — Greenberg Traurig, LLP

(57) ABSTRACT

The present invention provides a system and method for curating media content. The method comprises: retrieving, by a computing device, from a database, a set of media content, and first set of metadata associated with the set of media content; sorting, by the computing device, the set of media content based on at least a first parameter, and at least a second parameter, wherein each of at least the first parameter and at least the second parameter comprises weightage values for each media content of the set of media content; and organizing, by the computing device, the set of media content based on a cumulative weightage value of each media content of the set of media content.

27 Claims, 9 Drawing Sheets

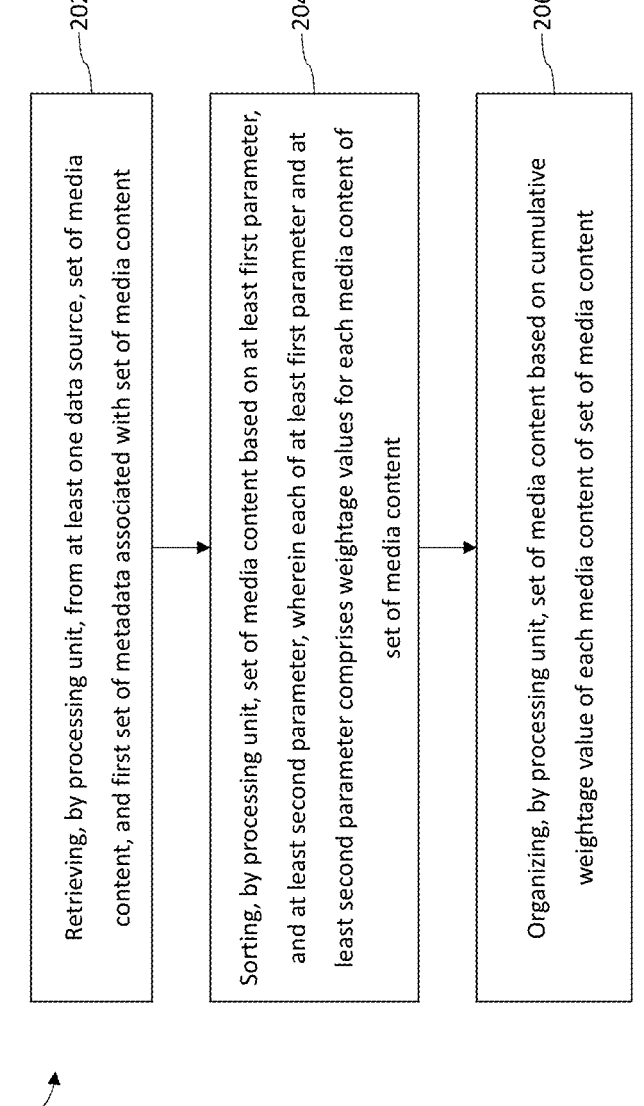

Retrieving, by processing unit, from at least one data source, set of media content, and first set of metadata associated with set of media content — 202

Sorting, by processing unit, set of media content based on at least first parameter, and at least second parameter, wherein each of at least first parameter and at least second parameter comprises weightage values for each media content of set of media content — 204

Organizing, by processing unit, set of media content based on cumulative weightage value of each media content of set of media content — 206

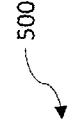
FIG. 5

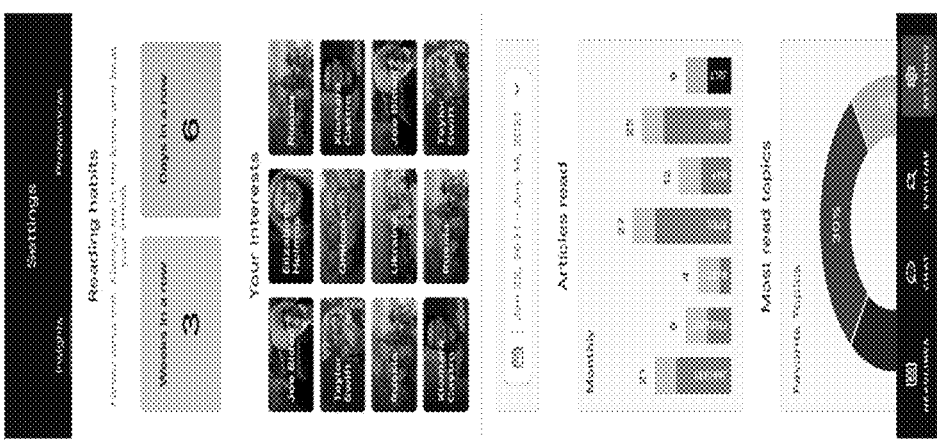
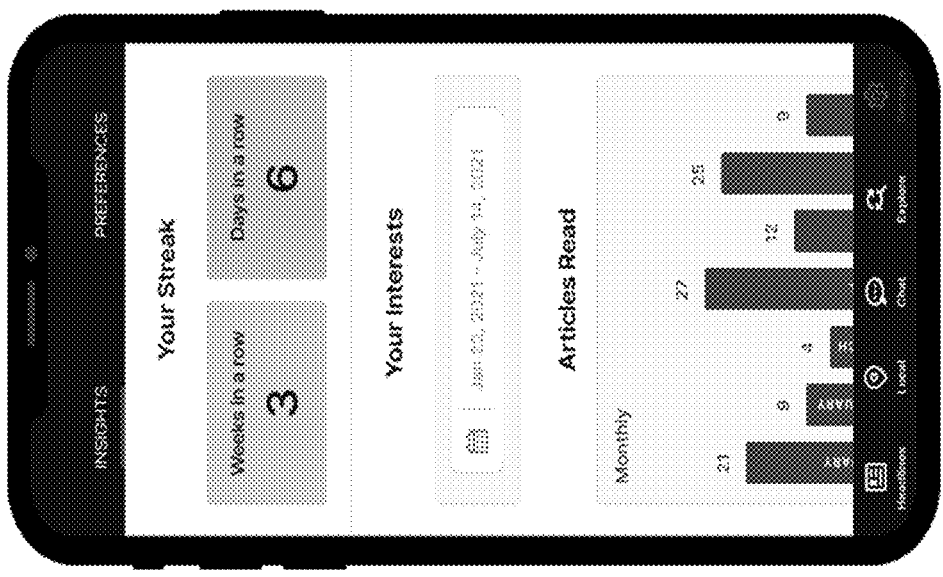
FIG. 7

800

METHOD AND SYSTEM FOR CURATING MEDIA CONTENT

CROSS REFERENCE TO RELATED APPLICATION

This application claims the benefit under 35 U.S.C. § 119(e) of U.S. Provisional Patent Application No. 63/531,336, filed Aug. 8, 2023, the entire contents of which are incorporated herein by reference.

FIELD OF INVENTION

The present invention generally relates to personalized media content recommendations. In particular, the present invention relates to a method and system of providing personalized media content recommendations.

BACKGROUND

This section is intended to provide information relating to the field of invention and thus, any approach or functionality described herein should not be assumed to qualify as prior art merely by its inclusion in this section.

With the development and growth of the internet, information consumption and sharing by users have increased. Media content, such as news, is one of the popular forms of information to know an interesting topic, facts, history, events, local or world-level activity, and the like. Traditionally, newspapers, radio broadcasts, and television were the primary sources of news. However, the development of internet technology brought about a new era of digital news consumption, giving rise to numerous online news platforms and applications. While these technologies have made it easier to access news, they have also resulted in an information overload, making it difficult for users to sift through, understand, discuss, and share news content effectively and efficiently.

Many existing systems tend to provide generic content recommendations that do not take into account the individual user's preferences, interests, and content engagement history. This results in a lack of personalization and relevance for each user. Existing systems often use static algorithms that do not adapt over time. As a result, these systems can become outdated and less effective as user behavior and preferences change. Current existing systems may fail to sufficiently prioritize and highlight fresh, recent content. This leads to users being presented with outdated or stale information. Many existing systems do not incorporate measures of user engagement (likes, comments, shares) effectively into their ranking algorithms. This means they may not accurately reflect the level of user interest or engagement with a particular piece of content. Existing systems may not fully utilize all available data types. For example, they might rely heavily on text-based data and ignore other data types like images, videos, or audio, which could provide valuable signals for content ranking. There can be an overreliance on popularity metrics (such as view count), leading to a "rich-get-richer" effect where popular content gets more exposure, thereby receiving even more views and engagement, while less popular but potentially high-quality and relevant content gets overlooked. Many systems may not sufficiently consider the context of user interactions. For instance, a like, comment, or share might carry different weight depending on the specific context in which it was made, but this nuance may be lost in existing systems. Algorithms used for content curation and ranking are often opaque, making it hard for users to understand why certain content is recommended to them. This lack of transparency can lead to user dissatisfaction and mistrust.

Hence, in view of these and other existing limitations, there arises an imperative need to provide an efficient solution to overcome the above-mentioned limitations. The proposed disclosure provides a system and method for personalized multimedia recommendation and ranking that could significantly improve the news consumption experience for users. The present disclosure aims to address these limitations with a sophisticated, AI-powered approach that emphasizes personalization, freshness of content, user engagement, and efficient use of multimodal data.

SUMMARY

This section is intended to introduce one or more aspects and/or embodiments of the present invention in a simplified form and is not intended to identify any key advantages or features of the present invention.

In an aspect of the present invention, there is provided a method for curating media content. The method comprises retrieving, by a processing unit, from a database, a set of media content, and a first set of metadata associated with the set of media content; sorting, by the processing unit, the set of media content based on at least a first parameter, and at least a second parameter, wherein each of at least the first parameter and at least the second parameter comprises weightage values for each media content of the set of media content; and organizing, by the processing unit, the set of media content based on a cumulative weightage value of each media content of the set of media content.

In an aspect of the present invention, the first set of metadata comprises at least user engagement of a plurality of users with each media content of the set of media content, and at least a time stamp of generation of each media content of the set of media content.

In an aspect of the present invention, at least the first parameter comprises weightage values to be associated to different user engagements of the plurality of users with each media content of the set of media content.

In an aspect of the present invention, at least the second parameter comprises weightage values to be associated to different times of generation of each media content of the set of media content relative to a current period.

In an aspect of the present invention, sorting the set of media content further comprises: sorting, by the processing unit, the set of media content based on at least a third parameter, wherein at least the third parameter comprises weightage values for each media content of the set of media content, and at least the third parameter comprises weightage values to be associated to different types of media content.

In an aspect of the present invention, the method comprises at least one of: determining, by the processing unit, the third parameter based on a historical preference of a first user; and receiving, by the processing unit, the third parameter from the first user.

In an aspect of the present invention, the method comprises providing, by the processing unit, at a user device associated with a first user, the organized set of media content.

In an aspect of the present invention, the method comprises: generating, by the processing unit, a first link associated with the organized set of media content; and providing, by the processing unit, at the user device, the first link to the first user.

In an aspect of the present invention, the method comprises: extracting, by the processing unit, from each media content of the set of media content, salient attributes corresponding to each media content, wherein the salient attributes of a media content has a predefined size smaller than the media content; and providing, by the processing unit, at a user device associated with a first user, a set of salient attributes corresponding to the organized set of media content.

In an aspect of the present invention, the method comprising generating, by the processing unit, a summarized media content based on the set of salient corresponding to the organized set of media content, wherein the summarized media content comprises at least one of a video-based media content, an audio-based media content, and a combination thereof.

In an aspect of the present invention, the method comprises: generating, by the processing unit, a second link associated with at least one of the set of salient attributes corresponding to the organized set of media content, and the summarized media content; and providing, by the processing unit, at the user device, the second link to the first user.

In an aspect of the present invention, the at least one data source comprises a database comprising one or more sets of media content, wherein the method comprises: periodically updating the one or more sets of media content in the database, and wherein periodically updating the one or more sets of media content comprises replacing an oldest set of media content with a latest set of media content, wherein replacing the oldest set of media content occurs at a predetermined frequency.

In an aspect of the present invention, the processing unit comprises a learning engine, and wherein the learning engine comprises at least an artificial intelligence (AI) unit, or at least a machine learning (ML) unit.

In an aspect of the present invention, the at least one data source includes a database, an online content platform, a social media platform, a cloud storage a really simple syndication (RSS) feed, or a combination thereof.

In an aspect of the present invention, there is provided a system for curating media content. The system comprises a processing unit comprising a processor. The processing unit is configured to: retrieve, from at least one data source, a set of media content, and a first set of metadata associated with the set of media content; sort the set of media content based on at least a first parameter, and at least a second parameter, wherein each of at least the first parameter and at least the second parameter comprises weightage values for each media content of the set of media content; and organize the set of media content based on a cumulative weightage value of each media content of the set of media content.

In an aspect of the present invention, the first set of metadata comprises at least user engagement of a plurality of users with each media content of the set of media content, and at least a time stamp of generation of each media content of the set of media content.

In an aspect of the present invention, at least the first parameter comprises weightage values to be associated to different user engagements of the plurality of users with each media content of the set of media content.

In an aspect of the present invention, at least the second parameter comprises weightage values to be associated to different times of generation of each media content of the set of media content relative to a current period.

In an aspect of the present invention, to sort the set of media content, the processing unit is further configured to: sort the set of media content based on at least a third parameter, wherein at least the third parameter comprises weightage values for each media content of the set of media content, and at least the third parameter comprises weightage values to be associated to different types of media content.

In an aspect of the present invention, the processing unit is configured to at least one of: determine the third parameter based on a historical preference of a first user; and receive the third parameter from the first user.

In an aspect of the present invention, the processing unit is configured to provide, at a user device associated with a first user, the organized set of media content.

In an aspect of the present invention, the processing unit is configured to: generate a first link associated with the organized set of media content; and provide, at the user device, the first link to the first user.

In an aspect of the present invention, the processing unit is configured to: extract, from each media content of the set of media content, salient attributes corresponding to each media content, wherein the salient attributes of a media content has a predefined size smaller than the media content; and provide, at a user device associated with a first user, a set of salient attributes corresponding to the organized set of media content.

In an aspect of the present invention, the processing unit is configured to generate a summarized media content based on the set of salient corresponding to the organized set of media content, wherein the summarized media content comprises at least one of a video-based media content, an audio-based media content, and a combination thereof.

In an aspect of the present invention, the processing unit is configured to: generate, a second link associated with at least one of the set of salient attributes corresponding to the organized set of media content, and the summarized media content; and provide, at the user device, the second link to the first user.

In an aspect of the present invention, the at least one data source comprises a database comprising one or more sets of media content, wherein the processing unit is configured to: periodically update the one or more sets of media content in the database, and wherein periodically updating the one or more sets of media content comprises replacing an oldest set of media content with a latest set of media content, wherein replacing the oldest set of media content occurs at a predetermined frequency.

In an aspect of the present invention, the processing unit comprises a learning engine, and wherein the learning engine comprises at least an artificial intelligence (AI) unit, or at least a machine learning (ML) unit.

An aspect of the present invention provides a non-transitory computer readable storage medium storing instructions for curating media content, the instructions comprising executable code which, when executed by a processor, causes the processor to: retrieve from at least one data source, a set of media content, and a first set of metadata associated with the set of media content; sort the set of media content based on at least a first parameter, and at least a second parameter, wherein each of at least the first parameter and at least the second parameter comprises weightage values for each media content of the set of media content; and organize the set of media content based on a cumulative weightage value of each media content of the set of media content.

BRIEF DESCRIPTION OF ACCOMPANYING DRAWINGS

The present invention, both in terms of its organization and manner of operation, together with further objects and advantages, may best be understood by reference to the description, taken in connection with the accompanying drawings. These and other details of the present invention will be described in connection with the accompanying drawings, which are furnished only by way of illustration and not in limitation of the scope of the present invention.

FIG. 2 illustrates an exemplary schematic flow diagram for a method for curating media content, according to an embodiment of the present invention;

FIG. 5 illustrates an exemplary view of the interface of the user device depicting a means of extracting entities from the media content, according to an embodiment of the present invention;

FIG. 7 illustrates an exemplary view of the interface of the user device depicting a means to building a healthy engagement habit with the media content, according to an embodiment of the present invention;

Figure 8:
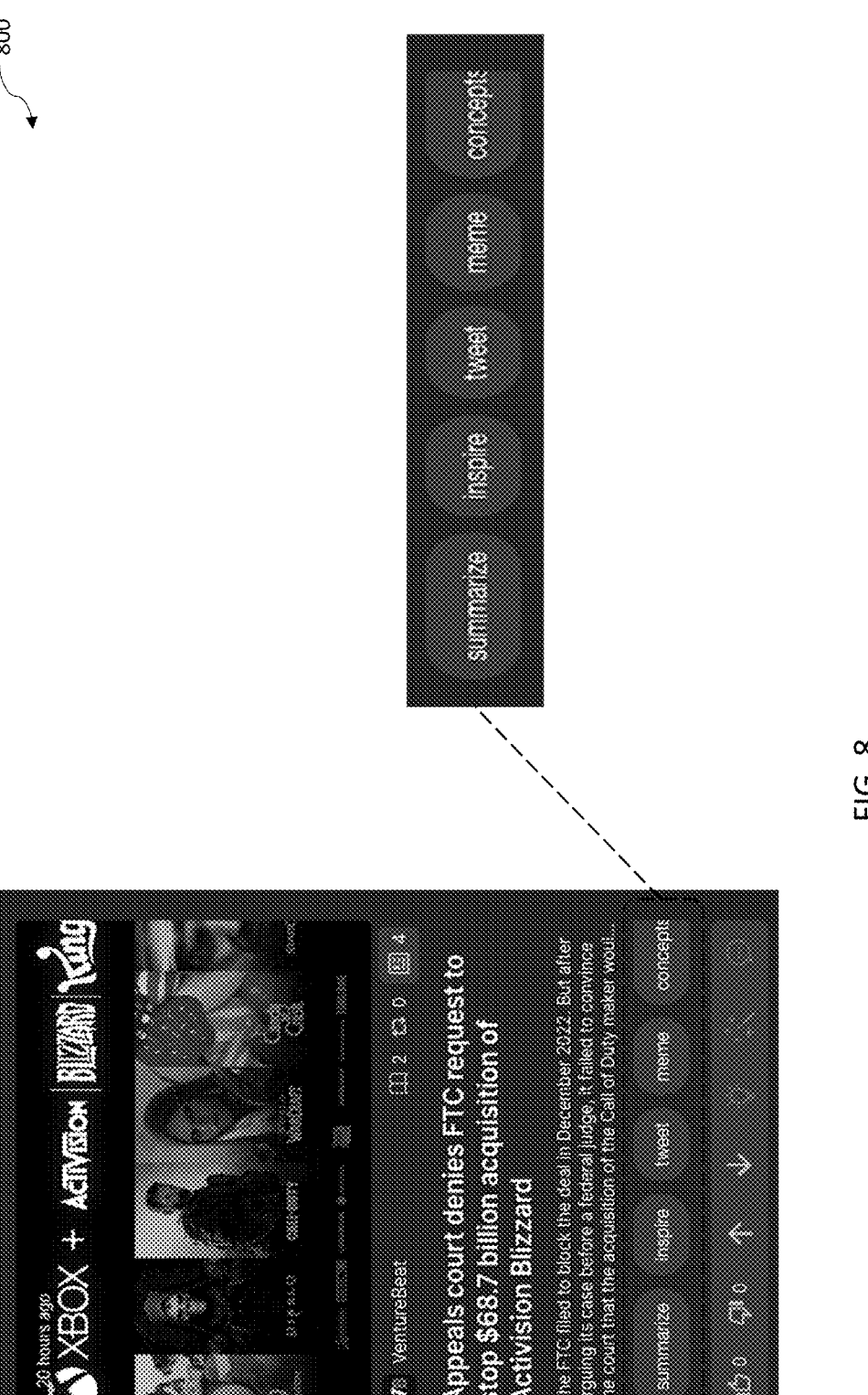
Figure 9:
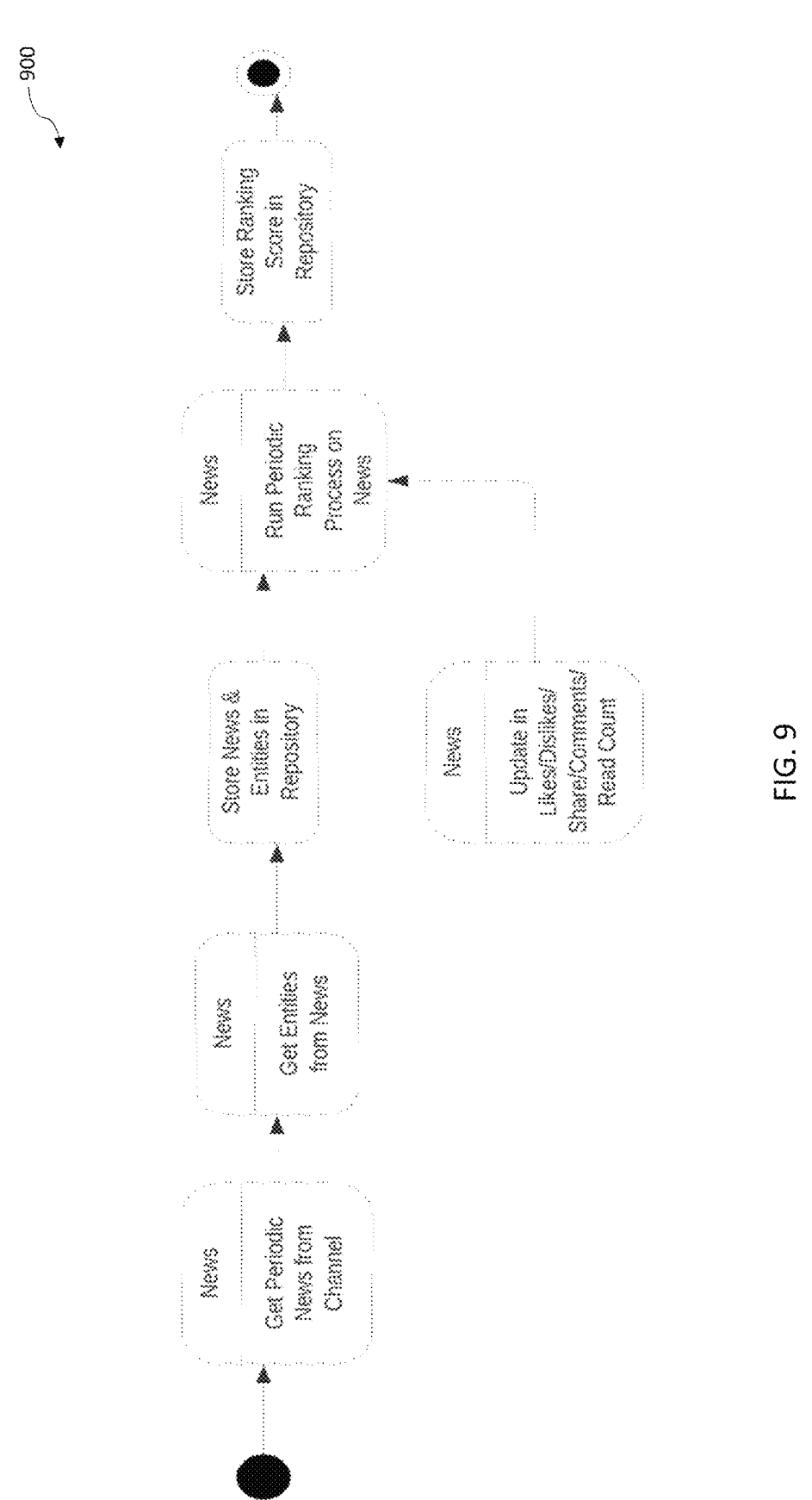

FIG. 8 illustrated an exemplary view of the interface of the user device depicting a list of prompts available for use by the first user, according to an embodiment of the present invention; and FIG. 9 illustrates an exemplary flow diagram depicting a process to organize the set of media content, according to an embodiment of the present invention.

DETAILED DESCRIPTION

In the following description, for the purposes of explanation, various specific details are set forth in order to provide a thorough understanding of one or more embodiments of the present invention. It will be apparent, however, that embodiments of the present invention may be practiced without these specific details. Several features described hereafter may each be used independently of one another or in any combination with other features. An individual feature may not address any of the problems discussed above or may address only some of the problems discussed above. Some of the problems discussed above may not be fully addressed by any of the features described herein. Example embodiments of the present invention are described below, as illustrated in various drawings, in which same reference numerals refer to the same parts throughout the different drawings.

As used herein, the term "media content" refers generally to any television program, on-demand program, pay-per-view program, broadcast media program, video-on demand program, commercial, advertisement, video, multimedia, textual content, graphic content, movie, song, photograph, audio programming, network services (e.g., Internet), or any segment, portion, component, or combination of these or other forms of media content that may be presented to and experienced (e.g., viewed, heard and/or read) by a user. A media content may have one or more components. For example, an exemplary media content may include a video component and/or an audio component and/or a textual component.

The present invention provides a method for curating media content. The method comprises retrieving, by a processing unit, from at least one data source, a set of media content, and a first set of metadata associated with the set of media content; sorting, by the processing unit, the set of media content based on at least a first parameter, and at least a second parameter, wherein each of at least the first parameter and at least the second parameter comprises weightage values for each media content of the set of media content; and organizing, by the processing unit, the set of media content based on a cumulative weightage value of each media content of the set of media content.

In an embodiment, the method comprises providing, by the processing unit, at a user device associated with a first user, the organized set of media content. In an embodiment, the first user is an ego user, for whom the method of the present invention is being implemented. The user device may include any, such as, without limitations, a mobile phone, a laptop, a tablet, a smart watch, any smart wearable device, etc. In an embodiment, the user device configured with a transceiver unit for bi-directional communication. In an embodiment, the communication may be via a wired communication network, or a wireless communication network. In a preferred embodiment, the communication may be via the wireless communication network. The wireless communication may be using Wi-Fi, Bluetooth, Mobile networks, or combinations thereof.

It may be appreciated by persons skilled in the art that the aforementioned device(s) and communications network(s) are examples, and other devices or combination of devices, or other communication networks or combination of communication networks that perform similar functions are within the scope of this invention.

In an embodiment, the first set of metadata comprises at least user engagement of a plurality of users with each media content of the set of media content, and at least a time stamp of generation of each media content of the set of media content. In an embodiment, user engagement comprises at least one of number of playbacks of the media content, a number of user engagements such as comments, likes, dislikes, upvotes, downvotes, number of instances of sharing of the media content, and combinations thereof. In an embodiment, the time stamp of generation comprises at least one of a time at which the media content was generated, and the time at which the media content was last updated.

In an embodiment, at least the first parameter comprises weightage values to be associated to different user engagements of the plurality of users with each media content of the set of media content. For example, comments may be indicative of greater engagement of users with a media content, and thus, may have a greater weightage relative to likes and dislikes. In another example, a combination of views, comments and shares may have a higher weightage relative to just shares.

In an embodiment, at least the second parameter comprises weightage values to be associated to different times of generation of each media content of the set of media content relative to a current period. For example, a media content that is recently generated or edited may have a greater weightage relative to older media. Recency of the media content may be indicative of greater relevance or freshness of the media content.

In an embodiment, based on at least the first parameter and at least the second parameter, the set of media content is organized into a hierarchy. In an exemplary implementation, the media content that is most recent, and has the highest number of comments is organized, such that it is most visible to the first user. In other words, the media content that is most recent, and has the highest number of comments is placed first in a sequence of the set of media content for the first user to engage with.

In an embodiment, sorting the set of media content further comprises: sorting, by the processing unit, the set of media content based on at least a third parameter. At least the third parameter comprises weightage values for each media content of the set of media content. Further, at least the third parameter comprises weightage values to be associated to different types of media content.

In an embodiment, the third parameter relates to media content that the first user has a higher preference for. For example, the third parameter may relate to a type of media content, such as audio, video, audio-visual, textual, or combinations thereof, that the first user may have a preference for. In another example, the third parameter may relate to a topic of the media content, such as, science, politics, history, geo-politics, finance, etc. that the first user may have a preference for. Therefore, the set of media content is further re-organized such that the first user preference is also taken into account. For example, the media content that is most recent, has the highest number of comments, and is a type or about a topic that the first user has a preference for is placed first in a sequence of the set of media content for the first user to engage with.

In an embodiment, the method comprises at least one of: determining, by the processing unit, the third parameter based on a historical preference of the first user; and receiving, by the processing unit, the third parameter from the first user. In other words, the method may comprise learning a behavior of the first user based on historical behavior of the first user. For example, if the first user has historically preferred video content on topics related to science, the method may organize the set of media content, such that a video on a scientific topic that has the highest user engagement in terms of comments, and that is most recent may be placed at the start of the sequence of the set of media content for the first user to engage with.

In an embodiment, the method comprises: generating, by the processing unit, a first link associated with the organized set of media content; and providing, by the processing unit, at the user device, the first link to the first user. In an embodiment, the first link may be provided to the first user to facilitate the first user to share the organized set of media content with peers of the first user.

In an embodiment, the method comprises: extracting, by the processing unit, from each media content of the set of media content, salient attributes corresponding to each media content. The salient attributes of a media content have a predefined size smaller than the media content. The method further comprises providing, by the processing unit, at a user device associated with a first user, a set of salient attributes corresponding to the organized set of media content.

In an embodiment, the salient attributes may be any, such as, without limitations, a brief summary of the contents of the media content, important bits of information contained within the media content, audio preview of a text, a graphical representation of the text, profiles or brief information of personalities about whom the media content is about, etc. The salient attributes are provided as a condensed version of the media content for the first user to engage with. In other words, the collection and/or organization of the salient attributes of the media content is shorter than the actual associated media content. As a result, the first user may expeditiously peruse the media content.

In an embodiment, the method comprises generating, by the processing unit, a summarized media content based on the set of salient corresponding to the organized set of media content, wherein the summarized media content comprises at least one of a video-based media content, an audio-based media content, and a combination thereof. In other words, the salient attributes may be collated in a consumable format, such as, in a video format, in an audio format, or in an audio-visual format. Such a summarized media content may be easier for the first user to engage with.

In an embodiment, the method comprises: generating, by the processing unit, a second link associated with at least one of the set of salient attributes corresponding to the organized set of media content, and the summarized media content; and providing, by the processing unit, at the user device, the second link to the first user. In an embodiment, the second link may be provided to the first user to facilitate the first user to share the salient attributes corresponding to the organized set of media content with peers of the first user.

In an embodiment, the processing unit comprises a learning engine. In an embodiment, the learning engine comprises at least an artificial intelligence (AI) unit, or at least a machine learning (ML) unit. In an embodiment, the learning engine is configured to analyze the past behavior of the first user, and generate the third parameters accordingly. In an embodiment, the learning engine is configured to analyze the past behavior of the first user and determine the one or more peers of the first user that any generated link (e.g., the first link and/or the second link) may be shared with. In an embodiment, the learning engine is configured to analyze a media content and extract all the salient attributes of the media content.

It may be appreciated by persons skilled in the art that the learning engine may require training on past datasets. The past datasets may be actual datasets generated from use by the first user. The past datasets may also include simulated datasets. The training of the learning engine may be conducted using any technique or combination of techniques known in the art, and is considered to be within the scope of the present invention.

In an embodiment, the at least one data source comprises database comprising one or more sets of media content. The database may be a physical server, a cloud server, or a combination thereof. The database may be communicably coupled with content generators that generate media content. The database may be communicably coupled via a wireless or a wired communication network.

In an embodiment, the method comprises: periodically updating the one or more sets of media content in the database. Periodically updating the one or more sets of media content comprises replacing an oldest set of media content with a latest set of media content, wherein replacing the oldest set of media content occurs at a predetermined frequency. In other words, the database is regularly refreshed. Older content or content with least relevance is replaced with content that has greater relevance that has been more recently generated.

The present invention further provides a system for curating media content. The system comprises a processing unit comprising a processor. The processing unit is configured to: retrieve, from a database, a set of media content, and a first set of metadata associated with the set of media content; sort the set of media content based on at least a first parameter, and at least a second parameter, wherein each of at least the first parameter and at least the second parameter comprises weightage values for each media content of the set of media content; and organize the set of media content based on a cumulative weightage value of each media content of the set of media content.

In an embodiment, the processing unit further comprises a memory storing a set of instructions. The memory is communicably coupled to the processor and the instructions are executable by the processor to enable implementation, by the processing unit, of the method and system for curating media content.

In an embodiment, the first set of metadata comprises at least user engagement of the plurality of users with each media content of the set of media content, and at least the time stamp of generation of each media content of the set of media content.

In embodiment, at least the first parameter comprises weightage values to be associated to different user engagements of the plurality of users with each media content of the set of media content.

In an embodiment, at least the second parameter comprises weightage values to be associated to different times of generation of each media content of the set of media content relative to a current period.

In an embodiment, to sort the set of media content, the processing unit is further configured to: sort the set of media content based on at least a third parameter, wherein at least the third parameter comprises weightage values for each media content of the set of media content, and at least the third parameter comprises weightage values to be associated to different types of media content.

In an embodiment, the processing unit is configured to at least one of: determine the third parameter based on the historical preference of a first user; and receive the third parameter from the first user.

In an embodiment, the processing unit is configured to provide, at the user device associated with a first user, the organized set of media content.

In an embodiment, the processing unit is configured to: generate a first link associated with the organized set of media content; and provide, at the user device, the first link to the first user.

In an embodiment, the processing unit is configured to: extract, from each media content of the set of media content, salient attributes corresponding to each media content, wherein the salient attributes of a media content have a predefined size smaller than the media content; and provide, at a user device associated with a first user, a set of salient attributes corresponding to the organized set of media content.

In an embodiment, the processing unit is configured to generate a summarized media content based on the set of salient corresponding to the organized set of media content, wherein the summarized media content comprises at least one of a video-based media content, an audio-based media content, and a combination thereof.

In an embodiment, the processing unit is configured to: generate, a second link associated with at least one of the set of salient attributes corresponding to the organized set of media content, and the summarized media content; and provide, at the user device, the second link to the first user.

In an embodiment, the database comprises one or more sets of media content, wherein the processing unit is configured to: periodically update the one or more sets of media content in the database, and wherein periodically updating the one or more sets of media content comprises replacing an oldest set of media content with a latest set of media content, wherein replacing the oldest set of media content occurs at a predetermined frequency.

In an embodiment, the processing unit comprises a learning engine, and wherein the learning engine comprises at least an artificial intelligence (AI) unit, or at least a machine learning (ML) unit.

Figure 1:
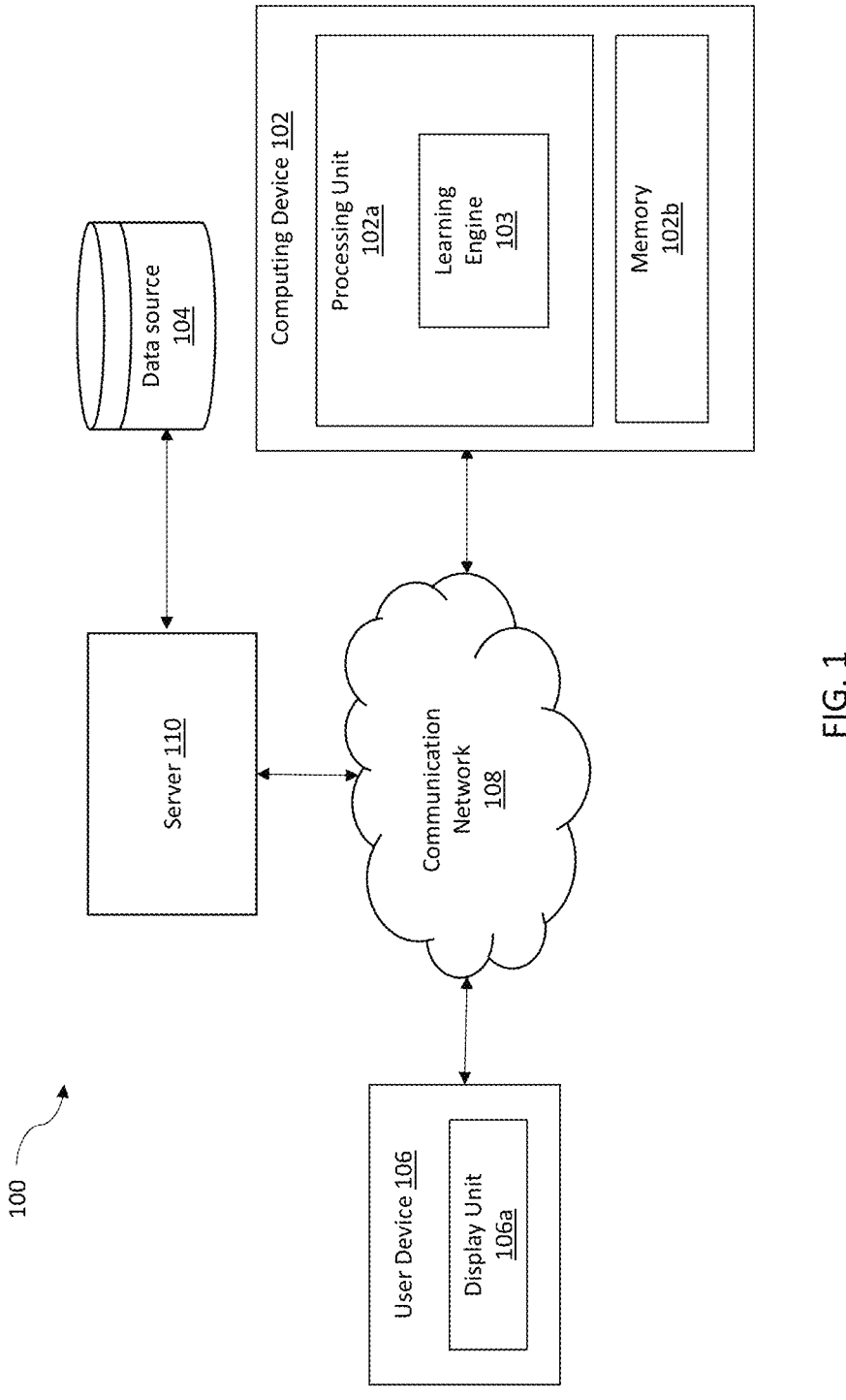
FIG. 1 illustrates an exemplary schematic block diagram of a system for curating media content, according to an embodiment of the present invention.

FIG. 1 illustrates a schematic block diagram of a system 100 for curating media content, according to an embodiment of the present invention. The system 100 comprises at least a computing device 102, at least one data source 104, and at least a user device 106 associated with a first user. Also, all of the components/units of the system 100 are assumed to be connected to each other unless otherwise indicated. The components are communicably coupled to one another via a communication network 108. Also, in FIG. 1, only a few units are shown. However, the system 100 may comprise multiple such units, or the system 100 may comprise any such number of said units, as required to implement the features of the present disclosure. Further, in an implementation, the system 100 may be present in the user device 106 to implement the features of the present invention. In an implementation, the system 100 may be implemented in the user device 106. In another implementation, the system 100 may be implemented such that the user device 106 is part of the system 100. In yet another implementation, the system 100 may reside partly within the user device 106.

The user device 106 comprises a display unit 106a. The display unit 106a may include a display device, an audio device, and/or a haptic device (not shown in figures).

The processing unit 102a may be implemented in a server 110. The server may be a physical server, or a cloud server. The computing device 102 comprises at least a processing unit 102a, and at least a memory 102b communicably coupled with at least the processing unit 102a. At least the memory 102b stores instruction (not shown) executable by at least the processing unit 102a. The processing unit 102a further comprises a learning engine 103. The learning engine 103 comprises at least one of an artificial intelligence (AI) model, a machine learning (ML) model, or a combination thereof. Similarly, the data source 104 may be implemented along with the server 110. The data source 104 may be a physical database or a cloud-based database or includes an online content platform, a social media platform, a cloud storage a really simple syndication (RSS) feed, or a combination thereof.

The processing unit 102a is configured to retrieve, from the at least one data source 104, a set of media content, and a first set of metadata associated with the set of media content. The processing unit 102a is further configured to sort the set of media content based on at least a first parameter, and at least a second parameter. Each of at least the first parameter and at least the second parameter comprises weightage values for each media content of the set of media content. The processing unit 102a is further configured to organize the set of media content based on a cumulative weightage value of each media content of the set of media content. For example, the data source 104 may comprise a database that stores a vast array of multimedia files and their associated metadata. Additionally, the data source may include online content platforms, such as news websites or video streaming services, which provide up-to-date content across multiple genres. Social media platforms, such as Facebook™, Twitter™, and Instagram™, also serve as data sources by offering user-generated content and social interactions. Cloud storage solutions, like Google Drive™ or Dropbox™, can store personal and shared multimedia files accessible through the system. Furthermore, a really simple syndication (RSS) feed provides a streamlined way to receive the latest updates from subscribed websites. The system can retrieve media content from any combination of these sources, ensuring a comprehensive and dynamic media curation process.

The first set of metadata comprises at least user engagement of the plurality of users with each media content of the set of media content, and at least the time stamp of generation of each media content of the set of media content.

The first parameter comprises weightage values to be associated to different user engagements of the plurality of users with each media content of the set of media content. Further, the second parameter comprises weightage values to be associated to different times of generation of each media content of the set of media content relative to a current period.

To sort the set of media content, the processing unit $102a$ is further configured to sort the set of media content based on at least a third parameter. The third parameter comprises weightage values for each media content of the set of media content, and at least the third parameter comprises weightage values to be associated to different types of media content. The processing unit $102a$ is configured to determine the third parameter based on the historical preference of a first user. In an alternate embodiment, the processing unit $102a$ is configured to receive the third parameter from the first user.

In an embodiment, the processing unit $102a$ is configured to provide, at the user device 106 associated with a first user, the organized set of media content.

In an embodiment, the processing unit $102a$ is configured to: generate a first link associated with the organized set of media content; and provide, at the user device 106, the first link to the first user.

The processing unit $102a$ is configured to extract, from each media content of the set of media content, salient attributes corresponding to each media content. The salient attributes of a media content have a predefined size smaller than the media content. The computing device is further configured to provide, at the user device 106, a set of salient attributes corresponding to the organized set of media content.

The processing unit $102a$ is configured to generate a summarized media content based on the set of salient corresponding to the organized set of media content, wherein the summarized media content comprises at least one of a video-based media content, an audio-based media content, and a combination thereof.

The processing unit $102a$ is configured to generate, a second link associated with the at least one of the set of salient attributes corresponding to the organized set of media content, and the summarized media content. The processing unit $102a$ is further configured to provide, at the user device 106, the second link to the first user.

The processing unit $102a$ is further configured to periodically update the one or more sets of media content in the data source 104 (such as database). Periodically updating the one or more sets of media content comprises replacing an oldest set of media content with a latest set of media content, wherein replacing the oldest set of media content occurs at a predetermined frequency.

FIG. 2 illustrates an exemplary schematic flow diagram for a method 200 for curating media content, according to an embodiment of the present invention. Referring to FIGS. 1 and 2, at step 202, the method 200 comprises retrieving, by the processing unit $102a$, from the data source 104, a set of media content, and a first set of metadata associated with the set of media content. At step 204, the method 200 comprises sorting, by the processing unit $102a$, the set of media content based on at least a first parameter, and at least a second parameter. Each of at least the first parameter and at least the second parameter comprises weightage values for each media content of the set of media content. At step 206, the method 200 comprises organizing, by the processing unit $102a$, the set of media content based on a cumulative weightage value of each media content of the set of media content.

The method 200 further comprises providing, by the processing unit $102a$, at a user device 106 associated with a first user, the organized set of media content.

The step 204 of sorting the set of media content further comprises sorting, by the processing unit $102a$, the set of media content based on at least the third parameter. At least the third parameter comprises weightage values for each media content of the set of media content. Further, at least the third parameter comprises weightage values to be associated to different types of media content.

The method 200 further comprises determining, by the processing unit $102a$, the third parameter based on a historical preference of the first user. Alternatively, the method 200 comprises receiving, by the processing unit $102a$, the third parameter from the first user.

The method 200 further comprises generating, by the processing unit $102a$, a first link associated with the organized set of media content. The method 200 further comprises providing, by the processing unit $102a$, at the user device 106, the first link to the first user.

The method 200 further comprises extracting, by the processing unit $102a$, from each media content of the set of media content, salient attributes corresponding to each media content. The salient attributes of a media content have a predefined size smaller than the media content. The method 200 further comprises providing, by the processing unit $102a$, at a user device 106 associated with a first user, a set of salient attributes corresponding to the organized set of media content.

The method 200 comprises generating, by the processing unit $102a$, a summarized media content based on the set of salient corresponding to the organized set of media content, wherein the summarized media content comprises at least one of a video-based media content, an audio-based media content, and a combination thereof.

The method 200 comprises: generating, by the processing unit $102a$, a second link associated with at least one of the set of salient attributes corresponding to the organized set of media content, and the summarized media content; and providing, by the processing unit $102a$, at the user device 106, the second link to the first user.

The method 200 further comprises periodically updating the one or more sets of media content in the data source 104 (such as database). Periodically updating the one or more sets of media content comprises replacing an oldest set of media content with a latest set of media content, wherein replacing the oldest set of media content occurs at a predetermined frequency.

Figure 3:
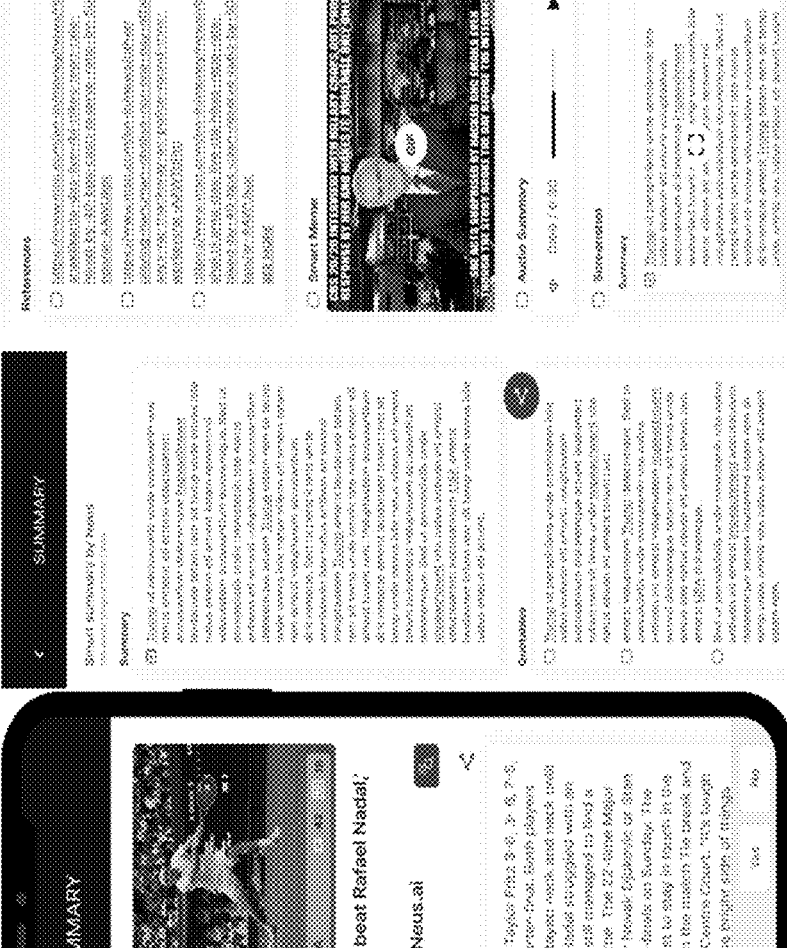
FIG. 3 illustrates an exemplary view of an interface of the user device depicting a plurality of means to summarize media content, according to an embodiment of the present invention.

FIG. 3 illustrates an exemplary view 300 of an interface of the user device 106 depicting a plurality of means to summarize media content, according to an embodiment of the present invention. Referring to FIGS. 1 and 3, the processing unit $102a$ is configured to execute, on the user device 106, an application, such as a web-based application or a mobile application. The application comprises an interface where the first user may interact with the application. The application enables the first user to engage with the media content (such as, read, view, share, comment, etc.).

The processing unit 102a is configured to extract, from the media content, salient attributes. Specifically, the processing unit 102a may utilize the learning engine 103 to extract the salient attributes. In the illustrated embodiment of FIG. 3, the interface shows a summary of a news media. The system 100 may provide users with a plurality of ways to summarize news articles. This can be particularly useful for users who want to quickly get the gist of a story without reading the full article. Examples of types of summaries may include, without limitations, around 100 words: a brief summary that provides the main points of the article;

top quotable sentences: the most noteworthy or quotable sentences from the article;

1 audio summary: an audio version of the summary, which is useful for users who prefer listening over reading;

opinions generated from the article: this could include key takeaways or interpretations derived from the article;

audio preview of text: this allows users to listen to a small portion of the full text of the article; and assembled video format of top article summaries: this could be a compilation of video summaries of top articles, providing a dynamic and engaging way for users to consume news.

Figure 4:
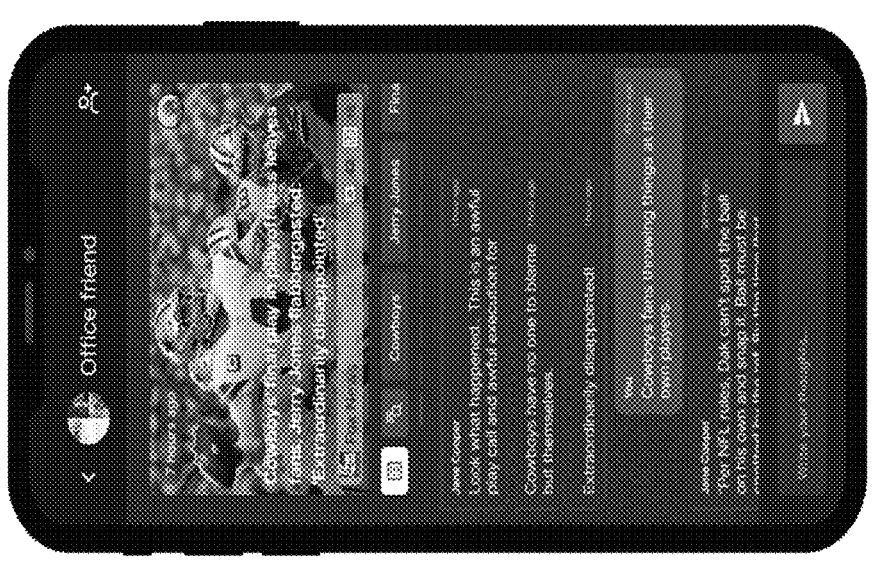
FIG. 4 illustrates an exemplary view of the interface of the user device depicting interaction between the first user and one or more peers of the first user, according to an embodiment of the present invention.

FIG. 4 illustrates an exemplary view 400 of the interface of the user device 106 depicting interaction between the first user and one or more peers of the first user, according to an embodiment of the present invention. Referring to FIGS. 1 and 4, the system 100 is configured to integrate elements of both social media and traditional news platforms, creating a hybrid news-sharing and discussion application. The system 100 may be linked to a contact list of the first user containing contact information of the peers of the first user. The system 100 allows easy sharing of first and second links generated by the processing unit 102a with the peer list of the first user.

FIG. 5 illustrates an exemplary view 500 of the interface of the user device 106 depicting a means of extracting entities from the media content, according to an embodiment of the present invention. Referring to FIGS. 1 and 5, the system 100 facilitates extraction of entities, such as names, locations, dates, etc. from the media content, and performing a proactive search on the entities, and providing the information to the first user. The processing unit 102a, and specifically, the learning engine 103 may be configured to "understand" the content of a news article by extracting key "entities" from it. For example, in a news article about a political event, the entities might be the politicians involved, the location of the event, the political parties, etc. The learning engine 103 is configured to identify these entities through techniques such as, without limitations, Natural Language Processing (NLP), a branch of AI that deals with the interaction between computers and human language. Based on the entities extracted, the system 100 can proactively search for additional relevant information. For instance, if a user is reading an article about a newly released movie, the system 100 can automatically find and present information about the cast, the director, the production company, etc. This is done without any prompting from the user, making it a "proactive" search.

The system 100 is further configured to receive questions from the first user related to the entities in the article. For example, the first user may query, "Who is the director of this movie?". The learning engine 103 may be configured to provide an answer to the query based on the extracted entities. This makes the news reading experience more interactive and informative.

Figure 6:
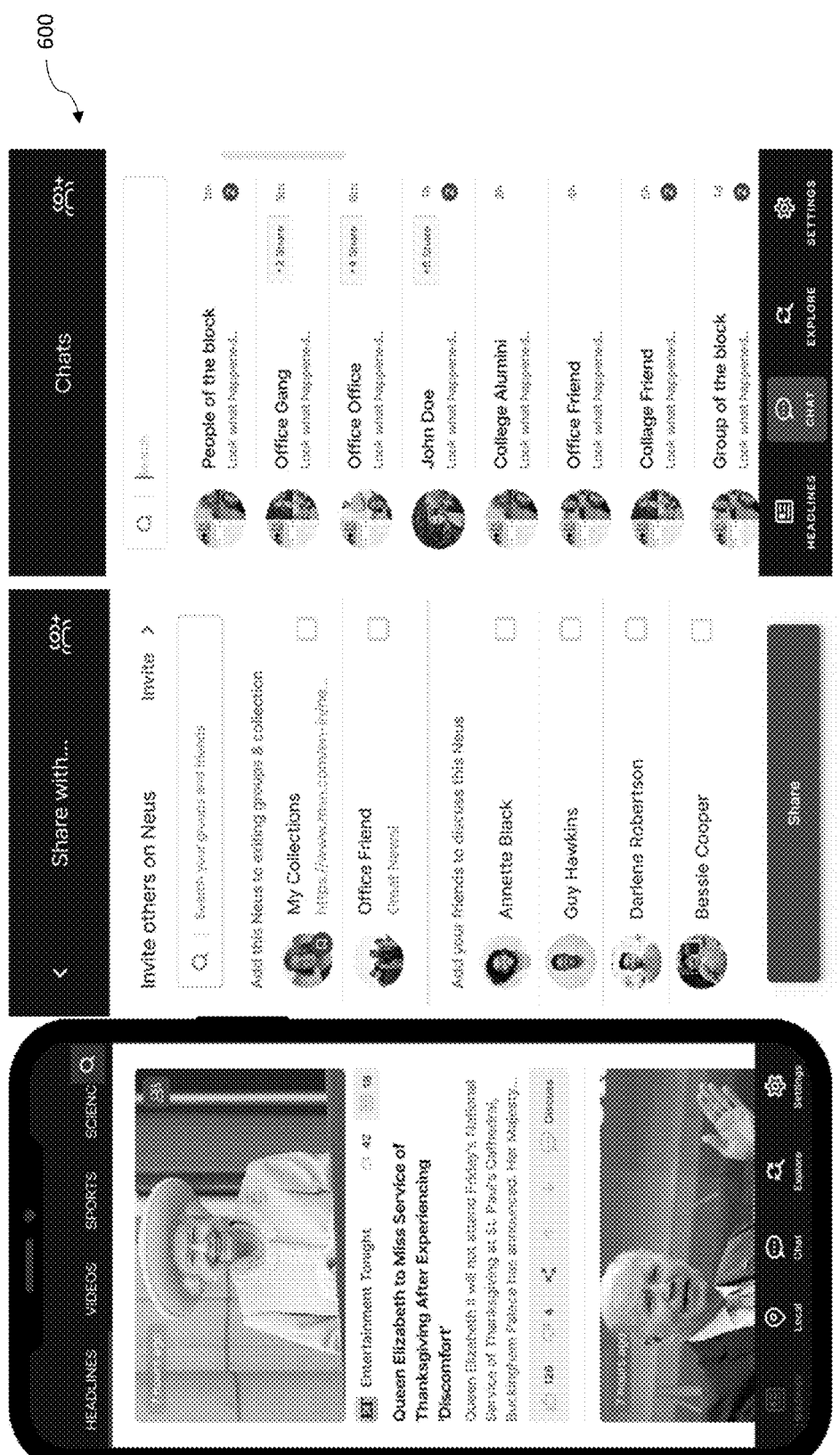
FIG. 6 illustrates an exemplary view of the interface of the user device depicting means for providing recommendations for sharing a media content with one or more peers of the first user, according to an embodiment of the present invention.

FIG. 6 illustrates an exemplary view 600 of the interface of the user device 106 depicting means for providing recommendations for sharing a media content with one or more peers of the first user, according to an embodiment of the present invention. Referring to FIGS. 1 and 6, the processing unit 102a is configured to analyze sharing behavior of the first user based on historic behavior of the first user. The processing unit 102a may be configured to recommend one or more peers of the first user who may find a specific media content useful or relevant.

The system 100 is configured to monitor types of media content (articles, summaries, etc.) the first user shares with their peers. Once the system 100 identifies similar articles, the system 100 may be configured to suggest sharing media content with a relevant one or more peers of the first user.

The system 100 is also configured to monitor what the first users share external to the application of the system 100. For instance, if the first user frequently posts articles from the application to a social media platform, the system 100 records such an action, and learns from the action. The learning engine 103 may recommend sharing a specified media content on social media platforms to the first user.

FIG. 8 illustrates an exemplary view 800 of the interface of the user device 106 depicting a list of prompts available for use by the first user, according to an embodiment of the present invention. Referring to FIGS. 1 and 8, the system 100 is configured to facilitate easy operation of the application. For example, when the first user shares a plurality of links within a chat window, the system 100 strings these links together into a playable series. This unique feature transforms the experience into a collaborative space for users to share and consume media content together.

In another example, if a group of users share different media content related to a specific topic, the system 100 is configured to form a playlist of the shared links, so that they may all be sequentially played back, instead of having to access and execute each link separately.

The system 100 may employ Language Learning Models (LLMs) in the context of media content consumption. The LLMs offers a variety of prompts that the first user can use to generate diverse content related to the media content that the first user ins engaging with. For example, the first user can use prompts to generate inspirational quotes, funny takes or jokes, list of key concepts, memes, and even social media messages related to the media content. Additionally, the first user may be able to generate quizzes, polls, and question-and-answer sets to test their understanding of the media content.

FIG. 9 illustrates an exemplary flow diagram 900 depicting a process to organize the set of media content, according to an embodiment of the present invention. Referring to FIGS. 1 and 9, the system 100 may be configured to provide users with fresh, relevant, and engaging news content while minimizing exposure to outdated or less engaging information. To achieve this, a ranking technique is employed to sort and prioritize the news articles based on several factors. The factors can include:

App Roles: the application has two primary roles: to provide fresh and relevant content for (a) individual consumption, (b) chatting with close friends, and (c) ensuring users don't miss out on the day's headlines. The proposed initial ranking could be c→b→a;

Likes: this is a reliable indicator of user preference. A user typically only likes a piece of content once, making this a useful metric;

Comments: this is a crucial factor, as it demonstrates user engagement with the content. While the nature of comments can vary, a high number of comments indicates that the content is exciting and engaging, warranting higher weightage in the ranking;

Shares: while not as critical as likes or comments, a high number of shares suggests that the content is interesting and warrants a degree of weightage in the overall ranking;

Views: this factor is uncertain but still useful. More views can help identify trending topics, keywords, or entities, though this should have a lower weightage in the overall calculation;

Time of Posting: this factor helps identify fresh, trending content. Older articles should be given lower priority, while recent posts should have higher priority;

Source: the credibility and consistency of a content source are important. Sources that consistently produce interesting content should receive higher weightage;

Category: user category preferences should be considered, with weightage given as per category points; and More/Less Option: user-selected entities or channels should get some weightage. More selection will add weightage, while less will remove the entity/channel from the sorted list. The selection should be reviewed after 30 days and removed if there's no engagement.

Exemplary Organization of Media Content $$\text{Effective Votes} = (\text{Likes} + \text{Dislikes}) * 1.25 + \text{Comments} * 2 + \text{Shares} * 1.5 + \text{Read}$$

$$\text{If Effective Votes are 0 then Effective Votes} = 10$$

$$\text{Time Difference in Hours } (X) = (\text{Current Date} - \text{Published Date}) / \text{Freshness (hr)}$$

$$\text{Ranking Score} = \big(\log(\text{Effective Votes})/(1 + X ** 1.8)\big)$$

The above ranking is generic based on system-level user's interaction and publish date. We can personalize ranking based on User's category weightage and More/Less selection of entities.

Source weightage
Category weightage
Entity weightage $$\text{Final Score} = \text{Ranking Score} + \text{Category Points} + \text{Entity Score} + \text{Source Score}$$

Example: Calculation Date 1st June at 8 PM

Posts posted on 1st June at 10:30 AM with 0 likes, 0 dislike, 0 comments, 0 share, 0 reads.

$$\text{Effective Vote} = (0 + 0) * 1.25 + 2 * 0 + 0 * 1.5 + 0 = 0 \qquad \text{Rank-1}$$

$$\text{Time Elapsed} = \text{1st June 2021 at 10:30 AM} - \text{1st June 2021 at 8 PM} = 9 \text{ hours}$$

$$\text{Ranking Score} = \log(10)/\big(1 + (9/4) ** 1.8\big) = 0.1885$$

Posts posted on 4th May at 10:30 AM with 5 likes, 1 dislike, 2 comments, 1 share, 3 reads.

$$\text{Effective Vote} = (5 + 1) * 1.25 + 2 * 2 + 1 * 1.5 + 3 = 16 \qquad \text{Rank-4}$$

$$\text{Time Elapsed} = \text{29th May 2021 at 10:30 AM} - \text{1st June 2021 at 8 PM} = 81 \text{ hours}$$

$$\text{Ranking Score} = \log(16)/\big(1 + (81/4) ** 1.8\big) = 0.005$$

Posts posted on 4th May at 6:30 PM with 5 likes, 1 dislike, 2 comments, 1 share, 3 reads.

$$\text{Effective Vote} = (5 + 1) * 1.25 + 2 * 2 + 1 * 1.5 + 3 = 16 \qquad \text{Rank-2}$$

$$\text{Time Elapsed} = \text{29th May 2021 at 6:30 PM} - \text{1st June 2021 at 8 PM} = 73 \text{ hours}$$

$$\text{Ranking Score} = \log(16)/\big(1 + (73/4) ** 1.8\big) = 0.006$$

Posts posted 3rd May at 10:30 AM with 25 likes, 5 dislikes, 10 comments, 10 shares, 20 reads.

$$\text{Effective Vote} = (25 + 5) * 1.25 + 10 * 2 + 10 * 1.5 + 20 = 92.5 \qquad \text{Rank-3}$$

$$\text{Time Elapsed} = \text{28th May 2021 at 10:30 AM} - \text{1st June 2021 at 8 PM} = 105 \text{ hours}$$

$$\text{Ranking Score} = \log(92.5)/\big(1 + (105/4) ** 1.8\big) = 0.006$$

An aspect of the present invention provides a non-transitory computer readable storage medium storing instructions for curating media content, the instructions comprising executable code which, when executed by a processor, causes the processor to: retrieve from at least one data source, a set of media content, and a first set of metadata associated with the set of media content; sort the set of media content based on at least a first parameter, and at least a second parameter, wherein each of at least the first parameter and at least the second parameter comprises weightage values for each media content of the set of media content; and organize the set of media content based on a cumulative weightage value of each media content of the set of media content.

Thus, the present invention provides key advantages, comprising:

Personalized Content: With this invention, multimedia content is no longer one-size-fits-all. The ranking technique adjusts the presentation of content based on user interactions, including likes, shares, comments, and views. It also considers the user's category preferences and the entities they have selected more or less of. This means each user sees a personalized stream of content that is most relevant to their interests and interactions.

Dynamic Updates: As users continue to interact with the platform, the ranking scores of individual pieces of content are adjusted in real time. This means the ordering of content isn't static but changes to highlight the most engaging content based on ongoing user interactions. As a result, the content displayed to users remains fresh and engaging.

Balanced Scoring Method: The ranking technique uses a range of factors to calculate a score for each piece of content. It isn't just about which content gets the most likes or comments. The technique also considers the freshness of the content (when it was posted), the reliability of the source, and the user's preferences for certain categories and entities. This leads to a fairer and more balanced ranking of content.

Versatility: The system is designed to handle different types of multimedia content, including text, audio, image, and video. This makes it versatile enough to be used on different types of platforms, whether they're focused on news articles, social media posts, podcasts, or other forms of content.

Avoiding Echo Chambers: The system is designed to prevent users from getting stuck in a loop of similar content. It does this by adjusting the weight given to the user's preferences over time and removing the weighting for entities that the user is no longer engaging with. This helps to ensure a variety of content is presented to the user.

Promoting Fresh Content: In many online platforms, older content that has received a lot of engagement can dominate over newer content. The present invention addresses this issue by giving a higher-ranking score to fresh content. This encourages users to engage with new content and helps to ensure the platform remains dynamic and up to date.

Automated Process: This ranking and personalization process is fully automated and carried out by a processor. This means the system can handle large volumes of content and interactions, providing a smooth and efficient user experience.

While the preferred embodiments of the present invention have been described hereinabove, it may be appreciated that various changes, adaptations, and modifications may be made therein without departing from the spirit of the invention and the scope of the appended claims. It will be obvious to a person skilled in the art that the present invention may be embodied in other specific forms without departing from its spirit or essential characteristics. The described embodiments may be considered in all respects only as illustrative and not restrictive.

What is claimed is:

1. A method for curating media content, comprising:
retrieving, by a processing unit, from at least one data source, a set of media content, and a first set of metadata associated with the set of media content;
sorting, by the processing unit, the set of media content based on at least a first parameter, and at least a second parameter, wherein each of at least the first parameter and at least the second parameter comprises weightage values for each media content of the set of media content;
organizing, by the processing unit, the set of media content based on a cumulative weightage value of each media content of the set of media content, wherein the cumulative weightage value is calculated based on at least the first parameter and the second parameter;
generating, by the processing unit, a first link associated with the organized set of media content; and
providing, by the processing unit, the first link to a first user at a user device, wherein the processing unit comprises a learning engine, wherein the first parameter comprises weightage values corresponding to different user engagements of a plurality of users with each media content of the set of media content and at least the second parameter comprises weightage values corresponding to different times of generation of each media content of the set of media content relative to a current period.

2. The method of claim 1, wherein the first set of metadata comprises at least user engagement of a plurality of users with each media content of the set of media content, and at least a time stamp of generation of each media content of the set of media content.

3. The method of claim 2, wherein the first parameter comprises weightage values corresponding to different user engagements of the plurality of users with each media content of the set of media content.

4. The method of claim 2, wherein at least the second parameter comprises weightage values corresponding to different times of generation of each media content of the set of media content relative to a current period.

5. The method of claim 1, wherein sorting the set of media content further comprises:
sorting, by the processing unit, the set of media content based on at least a third parameter, wherein
at least the third parameter comprises weightage values for each media content of the set of media content, and
at least the third parameter comprises weightage values corresponding to different types of media content.

6. The method of claim 5, wherein the method comprises at least one of:
determining, by the processing unit, the third parameter based on a historical preference of a first user; and
receiving, by the processing unit, the third parameter from the first user.

7. The method of claim 1, comprising providing, by the processing unit, at the user device associated with a first user, the organized set of media content.

8. The method of claim 1, comprising:
extracting, by the processing unit, from each media content of the set of media content, salient attributes corresponding to each media content, wherein the salient attributes of a media content have a predefined size smaller than the media content; and
providing, by the processing unit, at a user device associated with a first user, a set of salient attributes corresponding to the organized set of media content.

9. The method of claim 8, comprising generating, by the processing unit, a summarized media content based on the set of salient corresponding to the organized set of media content, wherein the summarized media content comprises at least one of a video-based media content, an audio-based media content, and a combination thereof.

10. The method of claim 9, comprising:
generating, by the processing unit, a second link associated with at least one of the set of salient attributes corresponding to the organized set of media content, and the summarized media content; and
providing, by the processing unit, at the user device, the second link to the first user.

11. The method of claim 1, wherein the at least one data source comprises a database comprising one or more sets of media content, wherein the method comprises:
periodically updating the one or more sets of media content in the database, and wherein periodically updating the one or more sets of media content comprises replacing an oldest set of media content with a latest set of media content, wherein replacing the oldest set of media content occurs at a predetermined frequency.

12. The method of claim 1, wherein the learning engine comprises at least an artificial intelligence (AI) unit, or at least a machine learning (ML) unit.

13. The method of claim 1, wherein the at least one data source includes a database, an online content platform, a social media platform, a cloud storage a really simple syndication (RSS) feed, or a combination thereof.

14. A system for curating media content, comprising:
a processing unit configured to:
    retrieve from at least one data source, a set of media content, and a first set of metadata associated with the set of media content;
    sort the set of media content based on at least a first parameter, and at least a second parameter, wherein each of at least the first parameter and at least the second parameter comprises weightage values for each media content of the set of media content;
    organize the set of media content based on a cumulative weightage value of each media content of the set of media content, wherein the cumulative weightage value is calculated based on at least the first parameter and the second parameter;
    generate a first link associated with the organized set of media content; and
    provide, at a user device, the first link to a first user, wherein the processing unit comprises a learning engine, wherein the first parameter comprises weightage values corresponding to different user engagements of a plurality of users with each media content of the set of media content and at least the second parameter comprises weightage values corresponding to different times of generation of each media content of the set of media content relative to a current period.

15. The system of claim 14, wherein the first set of metadata comprises at least user engagement of a plurality of users with each media content of the set of media content, and at least a time stamp of generation of each media content of the set of media content.

16. The system of claim 14, wherein the first parameter comprises weightage values corresponding to different user engagements of a plurality of users with each media content of the set of media content.

17. The system of claim 14, wherein at least the second parameter comprises weightage values corresponding to different times of generation of each media content of the set of media content relative to a current period.

18. The system of claim 14, wherein, to sort the set of media content, the processing unit is further configured to:
    sort the set of media content based on at least a third parameter, wherein
        at least the third parameter comprises weightage values for each media content of the set of media content, and
        at least the third parameter comprises weightage values corresponding to different types of media content.

19. The system of claim 18, wherein the processing unit is configured to at least one of:
    determine the third parameter based on a historical preference of a first user; and
    receive the third parameter from the first user.

20. The system of claim 14, wherein the processing unit is configured to provide, at a user device associated with a first user, the organized set of media content.

21. The system of claim 14, wherein the processing unit is configured to:
    extract, from each media content of the set of media content, salient attributes corresponding to each media content, wherein the salient attributes of a media content have a predefined size smaller than the media content; and
    provide, at a user device associated with a first user, a set of salient attributes corresponding to the organized set of media content.

22. The system of claim 21, wherein the processing unit is configured to generate a summarized media content based on the set of salient attributes corresponding to the organized set of media content, and wherein the summarized media content comprises at least one of a video-based media content, an audio-based media content, and a combination thereof.

23. The system of claim 22, wherein the processing unit is configured to:
    generate, a second link associated with at least one of the set of salient attributes corresponding to the organized set of media content, and the summarized media content; and
    provide, at the user device, the second link to the first user.

24. The system of claim 14, wherein the at least one data source comprises a database comprising one or more sets of media content, wherein the processing unit is configured to:
    periodically update the one or more sets of media content in the database, and wherein periodically updating the one or more sets of media content comprises replacing an oldest set of media content with a latest set of media content, wherein replacing the oldest set of media content occurs at a predetermined frequency.

25. The system of claim 14, wherein the learning engine comprises at least an artificial intelligence (AI) unit, or at least a machine learning (ML) unit.

26. The system of claim 14, wherein the at least one data source includes a database, an online content platform, a social media platform, a cloud storage a really simple syndication (RSS) feed, or a combination thereof.

27. A non-transitory computer readable storage medium, storing instructions for curating media content, wherein the instructions comprise executable code which, when executed by a processor, causes the processor to:
    retrieve from at least one data source, a set of media content, and a first set of metadata associated with the set of media content;
    sort the set of media content based on at least a first parameter, and at least a second parameter, wherein each of at least the first parameter and at least the second parameter comprises weightage values for each media content of the set of media content; and
    organize the set of media content based on a cumulative weightage value of each media content of the set of media content, wherein the cumulative weightage value is calculated based on at least the first parameter and the second parameter;
    generate a first link associated with the organized set of media content; and
    provide, the first link to a first user at a user device, wherein the processor comprises a learning engine, wherein the first parameter comprises weightage values corresponding to different user engagements of a plurality of users with each media content of the set of media content and at least the second parameter comprises weightage values corresponding to different times of generation of each media content of the set of media content relative to a current period.

* * * * *